United States Patent
Kobayashi et al.

(10) Patent No.: US 8,894,899 B2
(45) Date of Patent: Nov. 25, 2014

(54) METHOD OF PRODUCING FRICTION MATERIAL

(75) Inventors: Masaaki Kobayashi, Obu (JP); Yasutoshi Kitahara, Anjyo (JP); Naoki Odani, Toyoake (JP); Shusuke Suzuki, Aichi-gun (JP)

(73) Assignee: Advics Co., Ltd., Kariya-Shi, Aichi (JP)

( * ) Notice: Subject to any disclaimer, the term of this patent is extended or adjusted under 35 U.S.C. 154(b) by 0 days.

(21) Appl. No.: 13/991,873

(22) PCT Filed: Nov. 24, 2011

(86) PCT No.: PCT/JP2011/077026
§ 371 (c)(1),
(2), (4) Date: Jun. 5, 2013

(87) PCT Pub. No.: WO2012/077499
PCT Pub. Date: Jun. 14, 2012

(65) Prior Publication Data
US 2013/0256938 A1    Oct. 3, 2013

(30) Foreign Application Priority Data

Dec. 8, 2010 (JP) ................................ 2010-273834

(51) Int. Cl.
*F16D 69/02* (2006.01)

(52) U.S. Cl.
CPC .............. *F16D 69/02* (2013.01); *F16D 69/026* (2013.01); *F16D 69/025* (2013.01)
USPC .......................................... 264/109; 264/112

(58) Field of Classification Search
None
See application file for complete search history.

(56) References Cited

U.S. PATENT DOCUMENTS

| | | | |
|---|---|---|---|
| 5,433,907 A | 7/1995 | Ogiwara et al. | |
| 6,664,343 B2* | 12/2003 | Narisawa et al. | 525/474 |
| 6,667,104 B2* | 12/2003 | Aiba et al. | 428/447 |
| 7,205,345 B2* | 4/2007 | Harashina et al. | 524/116 |

(Continued)

FOREIGN PATENT DOCUMENTS

| | | |
|---|---|---|
| CN | 101693780 A | 4/2010 |
| JP | 3-177482 A | 8/1991 |

(Continued)

OTHER PUBLICATIONS

Office Action issued on Nov. 11, 2013, by the Chinese Patent Office in corresponding Chinese Patent Application No. 201180058616.9. (5 pages).

(Continued)

*Primary Examiner* — Mary F Theisen
(74) *Attorney, Agent, or Firm* — Buchanan Ingersoll & Rooney PC

(57) ABSTRACT

Provided is a method of producing a friction material that can prevent occurrence of dust generation and segregation at the time of mixing raw materials of the friction material and that is resistant to deterioration of the friction material even when a phenol resin is employed as a binder and that also allows the production process to be effected safely and speedily and at a low cost. The method includes a mixing step (A) for stirring the raw materials for the friction material containing a high-ortho phenol resin, slaked lime and 3-10 wt. % of water and a forming step (B) for forming a mixture powder obtained from the mixing step (A) to a desired shape at room temperature.

5 Claims, 3 Drawing Sheets

(56) References Cited

U.S. PATENT DOCUMENTS

| | | | |
|---|---|---|---|
| 7,297,728 B2* | 11/2007 | Yamamoto et al. | 523/149 |
| 2001/0027073 A1 | 10/2001 | Kobayashi et al. | |
| 2002/0010230 A1* | 1/2002 | Yamane | 523/149 |
| 2002/0058728 A1* | 5/2002 | Takahara et al. | 523/149 |
| 2009/0048369 A1* | 2/2009 | Newcomb et al. | 523/149 |

FOREIGN PATENT DOCUMENTS

| | | | |
|---|---|---|---|
| JP | 3-210338 A | 9/1991 | |
| JP | 5-320373 A | 12/1993 | |
| JP | 3173891 B2 | 3/2001 | |
| JP | 2001-247852 A | 9/2001 | |
| JP | 2010-077341 A | 4/2010 | |

OTHER PUBLICATIONS

International Search Report (PCT/ISA/210) issued on Feb. 21, 2012, by the Japanese Patent Office as the International Searching Authority for International Application No. PCT/JP2011/077026.

Written Opinion (PCT/ISA/237) issued on Feb. 21, 2012, by the Japanese Patent Office as the International Searching Authority for International Application No. PCT/JP2011/077026.

Notification of Transmittal of Translation of the International Preliminary Report on Patentability (Forms PCT/IB/338 and PCT/IB/373) and the Written Opinion of the International Searching Authority (Form PCT/ISA/237) issued on Jun. 20, 2013, in the corresponding International Application No. PCT/JP2011/077026. (5 pages).

* cited by examiner

METHOD OF PRODUCING FRICTION MATERIAL

TECHNICAL FIELD

The present invention relates to a method of producing a friction material for use in e.g. a disc brake pad for a vehicle.

BACKGROUND ART

Conventionally, as a method of producing a friction material for use in e.g. a disc brake pad or shoe for a vehicle, there are know a dry method and a wet method.

According to the dry method, all of raw material powders of a thermosetting resin such as a phenol resin, a fibrous base material such as a glass fibers, aramid fibers and a friction modifier such as rubber dust, cashew dust, metal powder etc. are mixed uniformly in a mixer. The resultant mixture is subject to a preforming step within a mold. Then, the formed product is transferred into a mold in which a back plate is set. The preformed product is heated and pressurized in the mold to be integrated with the back plate.

On the other hand, according to the wet method, all of the raw material powders are mixed and wetted uniformly in the presence of a solvent. The resultant wet raw material mixture is dried and then heated and pressurized for forming (e.g. Patent Document 1).

In general, raw materials for a friction material are mostly in the form of powder. Hence, e.g. when the dry method is implemented, when the mixture is removed after mixing of the friction-material raw materials, there may occur generation of dust which deteriorates the environment. Further, when powders having significantly different particle sizes are mixed altogether at one time, there may occur a segregation in which powder of large particles is deposited in the lower layer while powder of smaller particles is deposed in the upper layer, thus leading to insufficient dispersion, which makes it difficult to obtain a homogeneous friction material.

In order to prevent occurrence of such dust generation or segregation, it may be effective to implement the wet method in which mixing/stirring process is effected with charging a liquid of an organic solvent or the like together with the raw materials at the time of raw materials mixing. However, in case an organic solvent such as toluene, methanol, acetone, methyl ethyl ketone, etc. is charged, this may cause such a problem as a danger of catching a fire or an adverse effect to the human body. So, this is unfavorable in terms of working environment.

Patent Document 2, for instance, discloses a method of producing friction material in which as a liquid used in the wet method, there is employed water with no resin or the like dissolved therein, instead of the organic solvent and a phenol resin as a binder resin is formed into microcapsules.

In case water is employed in the wet method, there will occur elution of slaked lime (calcium hydroxide: $Ca(OH)_2$) added as a pH control agent and if a phenol resin is employed as a binder resin for the friction material, there may occur a "reddening degradation" of the mixture powder obtained by mixing of friction-material raw materials, which phenomenon adversely affects the strength of the friction material. However, according to the technique disclosed in Patent Document 2, by micro-encapsulating the phenol resin as a binder resin, it is made possible to prevent this binder resin from coming into contact with water or slaked lime. Thus, the reddening degradation of the phenol resin can be prevented, whereby deterioration in the strength of the friction material can be avoided.

BACKGROUND ART DOCUMENTS

Patent Documents

Patent Document 1: Japanese Patent No. 3173891
Patent Document 2: Japanese Unexamined Patent Application Publication No. 3-177482

SUMMARY OF THE INVENTION

Object to be Achieved by Invention

In the wet method disclosed in Patent Document 1, the wet raw-materials mixture, after its drying, is subject to a heating/pressurized forming process. This heating/pressurized forming process requires a few minutes for curing of the resin. In a production process of friction material, it is desired that the process can be carried out as speedily as possible, from the viewpoint of production efficiency.

Further, in the case of the technique disclosed in Patent Document 2 involving micro-encapsulation of binder resin, product cost increases due to this encapsulation. There is also conceivable a method of encapsulating slaked lime in order to prevent reddening degradation of the phenol resin. However, this method too suffers cost increase due to the encapsulation. Moreover, the encapsulation may invite a risk of deterioration in the friction performance of the friction material.

With the wet method disclosed in Patent Document 2, water is sprayed over the friction raw materials while these materials are being mixed. According to this method, water will adhere to the inner wall of the mixer, which promotes unwanted adhesion of the friction-material raw materials to this inner wall. Hence, the method suffers such problem as deterioration in the yield of the friction material and need for increased labor for cleaning of the mixer. Further, in case water is sprayed, this will wet only the surfaces of the friction-material raw materials being mixed. Hence, depending on the ratio of water added thereto, uniform mixing of the friction-material raw materials becomes difficult, thus again inviting occurrence of segregation.

Accordingly, the object of the present invention is to provide a method of producing a friction material that can prevent occurrence of dust and segregation at the time of mixing raw materials of the friction material and that is resistant to deterioration of the friction material even when a phenol resin is employed as a binder and that also allows the production process to be effected safely and speedily and at a low cost.

Means for Achieving the Object

For achieving the above-noted object, according to a first characterizing feature of a method of producing a friction material relating to the present invention, the method comprises a mixing step for stirring raw materials for the friction material containing a high-ortho phenol resin, slaked lime and 3-10 wt. % of water and a forming step for forming a mixture powder obtained from the mixing step to a desired shape at room temperature.

With the above-described arrangement, a high-ortho phenol resin is employed as a binder in the friction-material raw materials. And, in the friction-material raw materials, there is added slaked lime as an anti-rust adhesion measure relative to e.g. a disc brake rotor. The high-ortho phenol resin, thanks to its structure, has a distinguished alkali resistance. For this reason, when this high-ortho phenol resin is added to the mixture powder obtained by addition of slaked lime and water and having an alkaline property as a result thereof, there occurs no immediate reddening degradation of the high-ortho phenol resin. In addition, the high-ortho phenol resin has a higher cure rate than the phenol resin employed in the conventional friction material. Therefore, it is possible to produce the friction material speedily.

Normally, a friction material is cured when the raw materials thereof are heated. In case the friction-material raw materials are wetted with water to be rendered to a state that allows coexistence of slaked lime therein as proposed by the present invention, there are obtained certain degrees of fluidity and formability. That is, since the forming step in the present invention is effected at room temperature without heating, the room-temperature formed article formed of the mixture powder will not cure. However, this room-temperature formed article is not under a completely cured state, but under a state that the article can maintain a formed predetermined shape without being broken.

In order to allow the room-temperature formed article to maintain its formed shape, the amount of water to be added becomes essential. In this regard, according to the present invention, the amount of water to be added is adjusted to from 3 to 10 wt. % of the room-temperature formed article. With this setting of water content, there can be obtained fluidity and formability favorable for the room temperature forming. So that, the article can be formed at room temperature without buckling (deformation). More particularly, if this water content is below 3 wt. %, there occurs shortage of fluidity in the mixture powder, so that the buckling-restricting effect at the time of room temperature forming will be reduced, thus making favorable forming difficult. On the other hand, if the water content is greater than 10 wt. %, this will result in excessive increase in the fluidity, leading to muddy state, which also makes favorable forming difficult. Further, in this case, a drying step of the mixture powder becomes necessary, so that the friction material cannot be produced speedily.

Further, since the inventive method of producing a friction material is a wet type method using water, the production process can be carried out safely. For instance, at the time of mixing the friction-material raw materials and removing the resultant mixture after mixing, generation of dust can be restricted. Moreover, since the mixture powder can be prepared with addition of an appropriate amount of water thereto, uniform mixing of the raw materials is promoted. Consequently, there can be produced a friction material having superior homogeneity with occurrence of less segregation therein.

According to a second characterizing feature of the inventive method of producing a friction material, the forming step is effected in 1-60 seconds.

With the above-described arrangement, the forming step can be effected only for a short period of time at room temperature. Hence, it is possible to significantly reduce the time period required for the heating/pressurized forming step, which step would require a few minutes in the case of Patent Document 1. In this way, since the energy required for heating can be saved, the friction material can be produced at low cost and in a speedy manner as well. And, with such saving of heating energy, the emission amount of carbon dioxide can be reduced also. Hence, the inventive method of producing friction material is favorable to address to the environmental problem.

According to a third characterizing feature of the inventive method of producing a friction material, a surface active agent is added to the water.

With the above-described arrangement, when the friction-material raw materials are mixed, the respective components of the friction-material raw materials can be mixed in a more reliable manner thanks to the surface activation effect of the added surface active agent.

According to a fourth characterizing feature of the inventive method of producing a friction material, water-impregnated fibers are added to the friction-material raw materials.

With the above-described arrangement, fibers impregnated with water in advance can be added to the friction-material raw materials. As described above, in the wet method, water is sprayed over the friction-material raw materials which are being mixed. Hence, in this method, the water will tend to adhere to the inner wall of the mixer, which promotes unwanted adhesion of the friction-material raw materials to this inner wall and occurrence of segregation. On the other hand, with the inventive arrangement described above, with addition of fibers impregnated with water in advance to the friction-material raw materials, it becomes easy to cause the water to permeate the friction-material raw materials entirely, so uniform mixing of the friction-material raw materials is made easier, whereby generation of dust can be restricted and moreover a friction material having superior homogeneity with less segregation can be produced.

Further, if the mixing step is effected with addition of water-impregnated fibers, it becomes easier to cause water to be permeated in the entire friction-material raw materials, rather than only in the surface of the friction-material raw materials which is the case with spraying of water. Hence, the friction-material raw materials can be more uniformly mixed easily. As a result, generation of dust can be restricted and there can be produced a friction material having distinguished homogeneity with less segregation.

Incidentally, advantageously, the sum total amount of water impregnated in the water-impregnated fibers and the water to be fed by way of spraying or the like is adjusted finally to 3-10 wt. % of the mixture powder.

According to a fifth characterizing feature of the inventive method of producing a friction material, the method further comprises, subsequent to the forming step, a heating step for heating the formed mixture powder by causing it to come into contact with a plate-like member.

With the above-described arrangement, as a heating process is effected with placing the room temperature formed article formed of the mixture power in pressed contact with the plate-like member, the room-temperature formed article can be cured. In the course of this, if the pressure is applied solely in the direction of pressurized contact between the room-temperature formed article and the plate-like member, it becomes possible to cause water and gas generated during the curing reaction form the lateral portions of the room-temperature formed article to be discharged smoothly. As a result, there is hardly any possibility of formation of cracks in the formed article at the time of the heating process.

Further, according to the convention, as is the case with the wet method described in Patent Document 1, the mixture powder obtained by mixing of friction-material raw materials is cured by a heat-forming process. Whereas, in the case of the present invention, the heating step is effected after the room temperature forming process. Namely, during the heat-forming process which is continued for a few minutes, pressurization is needed, so that the material cannot be removed from the mold during the process. Therefore, this process is a factor slowing down the production, thus leading to deterioration of the production efficiency. On the other hand, according to the present invention, since the forming step at room temperature is effected for a few seconds only for forming a room-temperature formed article, it is possible to eliminate a time period which would otherwise be required for placing a formed article (room-temperature formed article) in a forming device. Therefore, the cycle in the forming device available for the forming step can be significantly increased advantageously. Consequently, the production efficiency can be improved. The room-temperature formed article which has undergone only the forming step can be subject to a curing process in the subsequent heating step together with other formed articles at one time.

MODE OF EMBODYING THE INVENTION

Next, an embodiment of the present invention will be described with reference to the accompanying drawings.

A friction material produced by the inventive method of producing a friction material (FIG. 1) can be used in e.g. a pad of a disc brake for a vehicle. The invention, however, is not limited thereto. The invention may be applied to other known devices or the like such as a brake shoe, etc. which use a friction material. The produced friction material is integrated with a plate-like member (a back plate) 20 such as a metal plate to be used as a brake pad 100 (FIG. 2).

Figure 1:
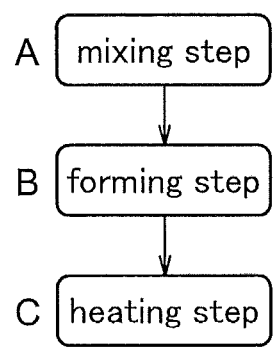
FIG. 1 is a flowchart schematically illustrating respective steps of a production process of a friction material according to the present invention.
Figure 2:
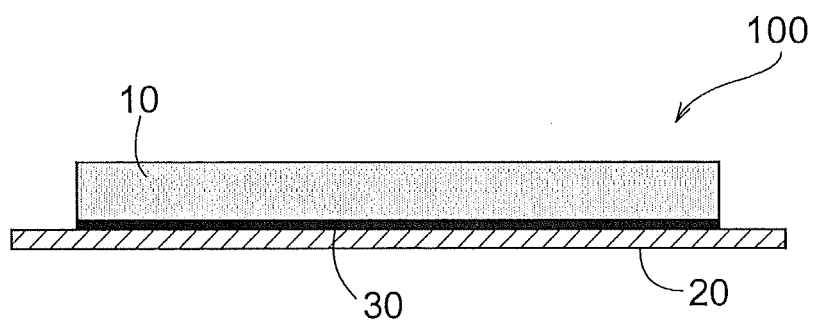
FIG. 2 is a section view of a brake pad including the friction material.

The method of producing a friction material according to the present invention includes a mixing step A for stirring friction-material raw materials including high-ortho phenol resin, slaked lime and 3-10 wt. % of water and a forming step B for forming the mixture powder obtained from the mixing step into a predetermined shape at room temperature (FIG. 1).

In the above, the term "friction-material raw materials" refers to all materials that are mixed for the production of the target friction material. These friction-material raw materials are not particularly limited in the present invention. Any conventionally employed materials such as a mixture of a fibrous base material, a friction modifier, a filler, a binder, etc. can be employed.

As the fibrous base material for use as a fibrous component, there can be cited such examples as organic fibers such as aramid fibers, cellulose fibers, acrylic fibers, inorganic fibers such as glass fibers, rock wool, ceramics fiber, as well as metal fibers of e.g. copper, bronze, aluminum, brass, etc. Further, a combination of two or more kinds of these may also be used. The mixing ratio of the fibrous base material is not particularly limited, but should be added in a range of 3-5 wt. % of the friction-material raw materials.

These fibrous base materials may be impregnated with water in advance and then added as such to the friction-material raw materials. Advantageously, the water-impregnated fibers are water-impregnated organic fibers. With addition of the water-impregnated fibers to the friction-material raw materials, it becomes possible to decrease the amount of water to be sprayed. Hence, it becomes possible to restrict unwanted adhesion of sprayed water to the inner wall of the mixer. As a result, the possibility of adhesion of the friction-material raw materials to the inner wall of the mixer can be reduced, so that the inconvenience such as deterioration in the yield of the friction material and increased labor required for cleaning of the mixer can be avoided advantageously. Furthermore, if stirring in the mixing step is effected in accompaniment of addition of water-impregnated fibers, permeation of water over the entire friction-material raw materials becomes easier than spraying of water, so that the friction-material raw materials can be uniformly mixed more easily. As a result, generation of dust can be restricted even more effectively. And, there can be produced a friction material having even superior homogeneity due to further reduced occurrence of segregation.

In the case of using water-impregnated fibers, advantageously, the sum total water amount of the water contained in the water-impregnated fibers and water to be supplied by way or spraying or the like is arranged to range from 3 to 10 wt. % of the mixture powder finally formed of the mixture powder. In this, the entire amount of water to be added to the friction-material raw materials may be supplied via the water-impregnated fibers.

As some non-limiting examples of the friction modifier, there can be cited friction dust such as cashew dust, rubber dust, etc., calcium carbonate, barium sulfate, magnesium oxide, zirconium oxide, mica powder, graphite, molybdenum disulfide, ceramics, copper powder, brass powder, zinc powder, aluminum powder, expanded vermiculite, potassium titanate, iron oxide, zirconia, magnesia, etc. These may be used singly or in a combination of two or more kinds thereof. The mixing ratio of the friction modifier is not particularly limited. Advantageously, however, it is to be added to about 3-30 wt. % of the friction material.

As some non-limiting examples of the filler, there can be cited slaked lime (calcium hydroxide), calcium carbonate, etc. These may be used singly or in a combination of two or more kinds thereof. The mixing ratio of the filler is not particularly limited. Advantageously, however, it is to be added in about 2-25% of the friction-material raw materials.

Slaked lime can be added as a pH control agent to the friction-material raw materials as an anti-rust adhesion measure for e.g. a disk brake rotor. When water, slaked lime and high-ortho phenol resin are mixed together, viscosity is generated, thus producing mixture which can be formed at room temperature. However, if mixing is continued under this condition, there arises the possibility of this mixture powder getting adhered to the inside of the mixer and/or generation of heat. For this reason, advantageously, slaked lime should not be mixed simultaneously with the other raw materials, but the mixing process should be effected in two steps of mixing the other raw materials first and then mixing slaked lime therein. If the mixing process is effected in two steps in this manner, it becomes possible to intentionally reduce the period of presence of slate slaked lime in the friction-material raw materials, during the progress of the mixing step A. That is, since the friction-material raw materials can be stirred under a low viscosity condition until addition of slaked lime, there will hardly occur adherence of the friction-material raw materials to the inner wall of the mixer.

As the binder, high-ortho phenol resin is employed. This high-ortho phenol resin can be a novolak type phenol resin. The mixing ratio of the high-ortho phenol resin is not particularly limited. Advantageously, however, it is to be added in the range of about 10-20 wt. % of the friction-material raw materials.

Phenols for use as a material for the high-ortho phenol resin are not particularly limited. Advantageously, phenol, cresol, and mixtures thereof are often employed. Some other non-limiting examples thereof include xylenol, ethyl phenol, butyl phenol, alkyl phenol, halogenated phenol, monohydric phenol, polyhydric phenol, etc. These may be used singly or in a combination of two or more kinds thereof.

Further, aldehydes for use as a raw material of the high-ortho phenol resin are not particularly limited. Some non-limiting examples thereof include formaldehyde, paraformaldehyde, acetaldehyde, trioxane, chloral, propionaldehyde, polyoxymethylene, hexamethylenetetramine, etc. These may be used singly or in a combination of two or more kinds thereof.

In this invention, one having a ratio (ortho binding ratio) of a methylene group or substituted methylene group originated from the aldehyde ranging from 50 to 98% relating to the phenolic hydroxyl group can be employed. Further, the molecular weight of the high-ortho phenol resin is not particularly limited. Advantageously, one having an average molecular weight ranging from 200 to 3000 can be used.

In the present invention, the friction material is produced by the wet method using water. Hence, a high-ortho phenol resin having alkaline resistance is employed. For this reason, although the high-ortho phenol resin is added to the mixture having the alkaline property due to addition slaked lime thereto, there occurs no reddening degradation in the high-ortho phenol resin.

Water should be added in the range of 3 to 10 wt. % of the room-temperature formed article. With this setting of water content, there can be realized fluidity and formability favorable for the room temperature forming, so that forming can be effected in a favorable manner at room temperature without buckling (deformation).

To water, e.g. a surface active agent, a thickener or the like can be added.

With addition of a surface active agent to water, when the friction-material raw materials are mixed, the respective components of the friction-material raw materials can be mixed in more reliable manner due to the surface activation effect of the surface active agent added thereto. This surface active agent can be either an ion type or a non-ion type. As the surface active agent, any one of conventional agents such as sodium alkyl ester sulfate, polyoxyethylene alkyl ether, alkyl amine oxide, etc. can be employed. These may be used singly or in a combination of two or more kinds thereof. The mixing ratio of the surface active agent is not particularly limited. Advantageously, however, it is to be added in the range of 0.2-0.5 wt. %.

Further, with addition of a thickening agent to water, viscosity can be added to water. So, it becomes possible to prevent reliably generation of dust from the friction-material raw materials at the time of mixing process, for deterioration of the working environment. Addition of a thickening agent also contributes to improvement of strength of the friction material. As this thickening agent, polyethylene oxide, sodium polyacrylate, methylcellulose and mixtures thereof can be employed. These may be used singly or in a combination of two or more kinds thereof. The mixing ratio of the thickening agent is not particularly limited. Advantageously, however, it is to be added in the range of 0.2-0.5 wt. %.

At the mixing step A, the fibrous base material, the friction modifier, the filler (slaked lime) and the binder (high-ortho phenol resin) described above are charged into a mixing means and mixed therein to produce a mixture powder. More particularly, the friction-material raw materials are charged into a mixer (mixing means) such as a Henschel mixer. In this, water can be charged at one time e.g. after completion of mixing or can be charged in some divided portions or charged by a small amount continuously. Further alternatively, water can be charged into the friction material, so that the friction material may be granulated at the time of mixing thereof.

The mixing step A needs to be effected at room temperature. Therefore, when the friction-material raw materials are mixed in the mixer, cooling may be effected with a cooling means so as to avoid temperature rise of this mixer.

If the friction-material raw materials are wetted with water to provide the condition that allows coexistence of resins and slaked lime as proposed by the present invention, there are provided certain degrees of fluidity and formability.

The forming step B in the present invention is effected at room temperature, without any heating. Hence, there occurs no curing of the room-temperature formed article formed of the mixture powder as it is not subject to any heating. However, this room-temperature formed article is not under a completely cured state, but under a state that allows its formed predetermined shape to be maintained without deformation. The forming process may advantageously be effected by a forming machine (not shown) capable of press forming for instance.

The forming step can be effected for a period ranging from 1 to 60 seconds, preferably from 2 to 20 seconds. In this way, as the invention requires only effecting the forming step at room temperature for a short period of time, it is possible to significantly reduce the period in which a few minutes would conventionally be required for the heating/pressure forming process. In this way, as it is possible to save the energy which would be required for heating, it it possible to produce a friction material at low cost and speedily.

Subsequent to the forming step, there is effected a heating step C for heating the formed mixture powder (room-temperature formed article) 10 by placing this in contact with a back plate 20 (FIGS. 1 and 2). For this, the room-temperature formed article 10 can be bonded to the back plate 20 via an adhesive 30. The back plate 20 can be a metal plate for instance.

This heating step C can be carried out under heating conditions of 150-230° C. for 5-120 minutes, for instance. The invention is not limited to these particular conditions. Any heating conditions may be employed as long as they comprise a temperature condition and a time condition that allow curing of the high-ortho phenol resin added as a binder after melting thereof.

In the heating step C, contact between the room-temperature formed article 10 and the back plate 20 can be provided by clamping them together. Advantageously, a clamping tool employed in this should be pre-heated to a temperature near the heating temperature. With this, the room-temperature formed article 10 and the back plate 20 can be heated in a smooth manner and eventually, the bonding between the room-temperature formed article 10 and the back plate 20 and the curing of the room-temperature formed article 10 can be effected smoothly.

With the above-described heating process of the room-temperature formed article 10 and the back plate 20 with keeping them under pressurized contact against each other, the bonding between the room-temperature formed article 10 and the back plate 20 and curing of the room-temperature formed article 10 can be carried out at one time. In this, if the back plate 20 is bonded to one side of the room-temperature formed article 10 and pressure is applied to the room-temperature formed article 10 and the back plate 20 only along the direction of the pressurized contact thereof, it is possible to smoothly discharge moisture and gas generated at the time of curing reaction from the side of the room-temperature formed article 10. Therefore, there will be almost no possibility of cracks being formed in the formed article during the heating process.

If the heating step C is effected after the forming step B at room temperature as proposed by the present invention, there is no need to remove water by drying the room-temperature formed article 10 after the room-temperature forming. So, the friction material can be produced speedily by the amount of saving of time required for drying.

Since forming of the room-temperature formed article 10 alone is effected by effecting the room-temperature forming step B for a few seconds, the time required for setting the room-temperature formed article 10 in the forming machine can be eliminated. Therefore, the cycle in which the forming step can be effected in the forming machine is significantly increased, so that the production efficiency is improved. The room-temperature formed article 10 which has been subject to only the forming step can be subject to a curing process in the subsequent heating step together with other formed articles at one time. In this way, according to the present invention, there is no need for preparing many forming machines in the production line. So, the production line for the forming step B can be formed compact.

EMBODIMENTS

Example 1

Figure 3:
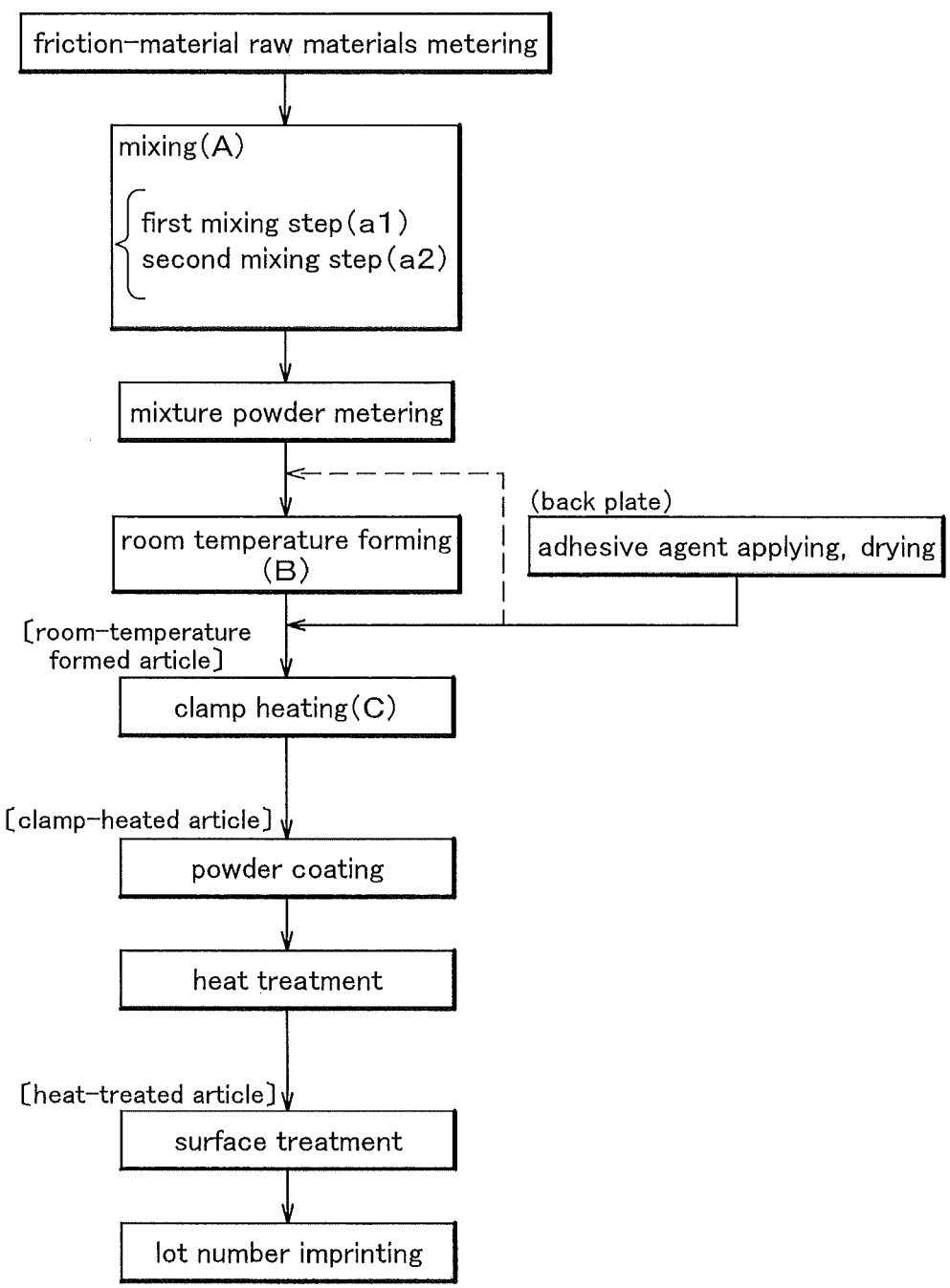
FIG. 3 is a flowchart illustrating in details the respective steps of the production process of the friction material according to the present invention.

Next, an embodiment of the method of producing a friction material relating to the present invention will be explained (FIG. 3).

After metering of the respective components of the friction-material raw materials, these were charged in a Henschel mixer to effect a mixing step A. In this mixing step A, mixing was effected in two steps. That is, at the first mixing step (a1), the friction-material raw materials other than slaked lime (high-ortho phenol resin, water, aramid fibers, friction modifier) were mixed together for 10 minutes. Subsequently, at the second mixing step (a2), slaked line (filler) was added thereto and these were mixed together for 2 minutes. After the mixture powder produced by the mixing was metered, this was subjected to a room-temperature forming (forming step B) for 10 seconds.

To the plate-like member 20, an amount of adhesive was applied and then dried on the side thereof on which the room-temperature formed article 10 was to be placed.

Then, the room-temperature formed article 10 was placed on the back plate 20 and a clamp heating process (heating step C) was effected at 160° C. for 10 minutes, whereby a cured friction material was produced. Thereafter, this friction material was subject to respective processes of a powder coating, heating process (210° C., 30 minutes), surface treatment (chamfering, slit processing, surface grinding), and a lot number imprinting.

Incidentally, in this Example 1, the heating step C was effected with placing the room-temperature formed article 10 on the back plate 20. Alternatively, a room-temperature forming may be effected with an amount of un-formed mixture powder on the back plate 20 and the heating step C may be effected thereafter (see FIG. 3: broken line portion).

REFERENCE EXAMPLE

Figure 4:
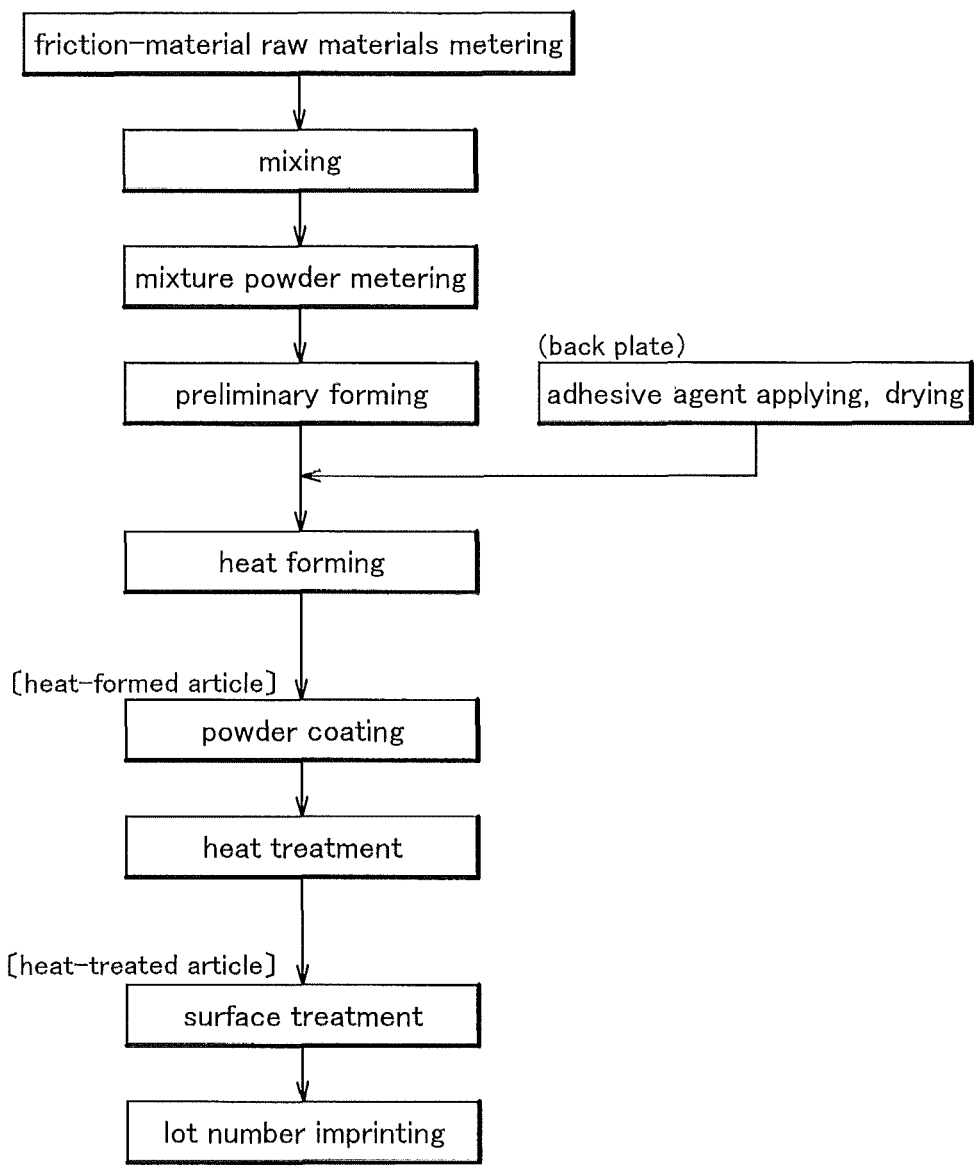
FIG. 4 is a flowchart illustrating a production process of a friction material according to the conventional art.

On the other hand, an example of the conventional method of producing a friction material will be explained next (FIG. 4).

After metering of the respective components of the friction-material raw materials, these were charged in a Henschel mixer to effect a mixing step. In this mixing step, all of the friction-material raw materials (random-novolak phenol resin, aramid fibers, friction modifier, filler) were mixed together for 14 minutes. After the mixture powder produced by the mixing was metered, this was subjected to a preliminary forming.

To the plate-like member, an amount of adhesive was applied and then dried on the side thereof on which the mixture powder was to be placed.

Then, the pre-formed mixture powder was placed on the back plate and a heat-forming process was effected at 160° C. for 260 seconds, whereby a cured friction material was produced. Thereafter, this friction material was subject to respective processes of a powder coating, heating process (210° C., 60 minutes), surface treatment and a lot number imprinting.

Example 2

By using the friction material producing method described in Example 1, friction materials were produced with varying the components of the friction material in many ways. In these, changes if any in scattering of dust at the time of production and in states of the mixture powders (room-temperature formed articles) were checked (Inventive Examples 1-7). And, as comparison examples, cases (Comparison Examples 1, 2) in which the water contents were set outside the range of 3-10 wt. % and cases (Comparison Examples 3-5) in which either high-ortho phenol resin or slaked lime was not added were checked also.

As the fibrous base material, either one of dried aramid fibers and water-impregnated aramid fibers were employed. As the high-ortho phenol resin, a novolak type was employed. As the friction modifier or the fibrous base material, an organic material and an inorganic material were employed. The organic material was added with cashew dust, rubber powder and the inorganic material was added with mica powder, barium sulfate, rock wool, graphite, potassium titanate, iron oxide, zirconia, and magnesia. As to the water content, the ratio of water was adjusted by dispersion-spraying of water over the friction-material raw materials.

Regarding Inventive Examples 1-7 and Comparison Examples 1-5, the dust scattering conditions at the time of mixing of the friction-material raw materials, the conditions of the mixture powders after mixing, and room-temperature forming performances were evaluated. And, the results thereof are shown in Table 1.

TABLE 1

|  | Inventive Example |  |  |  |  |  |  | Comparison Example |  |  |  |  |
|---|---|---|---|---|---|---|---|---|---|---|---|---|
|  | 1 | 2 | 3 | 4 | 5 | 6 | 7 | 1 | 2 | 3 | 4 | 5 |
| dry aramid fibers | 4 | 4 | 4 | 4 | 4 | 4 |  | 4 | 4 | 4 | 4 | 4 |
| water-impregnated aramid fibers (aramid net wt. %) |  |  |  |  |  |  | 4 |  |  |  |  |  |

TABLE 1-continued

|  | Inventive Example | | | | | | | Comparison Example | | | | |
| --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 |
| high-ortho novolak phenol resin | 10 | 10 | 10 | 10 | 10 | 10 | 10 | 10 | 10 | 10 | | |
| random novolak phenol resin | | | | | | | | | | | 10 | 10 |
| slated lime | 2 | 2 | 2 | 2 | 2 | 2 | 2 | 2 | 2 | | 2 | 2 |
| organic material | 7 | 7 | 7 | 7 | 7 | 7 | 7 | 7 | 7 | 7 | 7 | 7 |
| inorganic material | 77 | 77 | 77 | 77 | 77 | 77 | 77 | 77 | 77 | 79 | 77 | 77 |
| mixture powder water content (%) | 3.0 | 3.2 | 5.5 | 8.1 | 9.5 | 10.0 | 6.0 | 2.6 | 10.6 | 5.5 | 1.0 | 5.5 |
| dust scattering condition at mixing | ○ | ○ | ○ | ○ | ○ | ○ | ○ | ○ | ○ | ○ | x | ○ |
| condition of mixture powder at mixing | ○ | ○ | ○ | ○ | ○ | ○ | ○ | ○ | ○ | ○ | ○ | x |
| room temperature press formability | ○ | ○ | ○ | ○ | ○ | Δ | ○ | x | x | x | x | — |

On the dust scattering conditions, the dust generation conditions were evaluated by visual observation. Absence of scattering is indicated by "circle", presence of scattering is indicated by "cross".

On the conditions of mixture powders at mixing, the conditions of the powders after being left for 4 hours subsequent to heating were evaluated by visual observations. Absence of any change compared with condition after mixing is indicated by "circle", presence of reddening change in even a part of the powder (reddening degradation) is indicated by "cross".

On the room-temperature press formability, success of forming without buckling (deformation) is indicated by "circle", success of forming within a permissible range with adjustment of the forming pressure is indicated by "triangle", and poor formed condition due to cracks or flow (flow of mixture powder) at forming is indicated by "cross", respectively.

As the results, in Inventive Examples 1-7, favorable results were obtained in the respects of the powder dust scattering condition, condition of mixture powder after mixing and room-temperature formability. In Inventive Example 6 (water content 10%), formation within the permissible range was achieved with adjustment of the forming pressure. In Inventive Example 7 (with addition of water-impregnated aramid fibers), hardly any soiling of the inner wall of the mixing means was observed.

On the other hand, in Comparison Examples 1-5, cracks and/or flow occurred and the room-temperature formability was evaluated poor in all of these examples.

In Comparison Example 4 (with addition of random novolak phenol resin, water content 1%), occurrence of dust scattering was observed. In Comparison Example 5 (with addition of random novolak phenol resin, water content 5.5%), there was observed a condition of reddening change in the mixture powder after mixing. In Comparison Examples 4, 5 using the conventional phenol resin, in particular in Comparison Example 5, there was observed reddening degradation immediately after addition of water at the time of mixing and after a while subsequent to mixing, there was observed agglomeration in the mixture powder, so that the power could not be press-formed.

As described above, it was found that friction-material raw materials can be formed at room temperature if high-ortho phenol resin and slaked lime are added thereto and the water content thereof is adjusted to 3-10 wt. %.

Namely, with the inventive method of producing a friction material, it is possible to restrict generation of dust at the time of mixing of friction-material raw materials and also at the time of removal of the mixture after mixing. Further, since the mixture powder can be prepared with mixing of an appropriate water content therein, it is easy to mix the friction-material raw materials in an uniform manner. As a result, there can be produced a friction material having superior homogeneity with less segregation.

INDUSTRIAL APPLICABILITY

The method of producing a friction material according to the present invention may be used for production of a friction material for use in e.g. a disc brake pad of a vehicle or the like.

DESCRIPTION OF REFERENCE MARKS

A mixing step
B forming step
C heating step

The invention claimed is:

1. A method of producing a friction material, comprising:
a mixing step for stirring the raw materials for the friction material containing a high-ortho phenol resin, slaked lime and 3-10 wt. % of water, wherein the high-ortho phenol resin has an ortho binding ratio of a methylene group or substituted methylene group originated from the aldehyde ranging from 50 to 98% relative to the phenolic hydroxyl group; and
a forming step for forming a mixture powder obtained from the mixing step to a desired shape at room temperature.

2. The method according to claim 1, wherein the forming step is effected in 1-60 seconds.

3. The method according to claim 1, wherein a surface active agent is added to the water.

4. The method according to claim 1, wherein water-impregnated fibers are added to the friction-material raw materials, wherein the friction-material raw materials include 3-10 wt. % water.

5. The method according to claim 1, further comprising, subsequent to the forming step, a heating step for heating the formed mixture powder by causing it to come into contact with a plate-like member.

* * * * *